Oct. 11, 1955     R. E. MORGAN     2,720,579
TEMPERATURE CONTROL SYSTEM FOR ELECTRIC HEATING ELEMENTS
Filed April 3, 1952
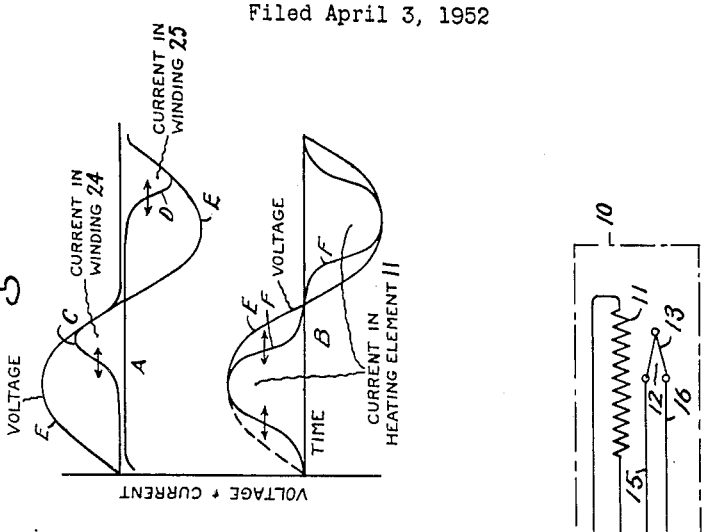
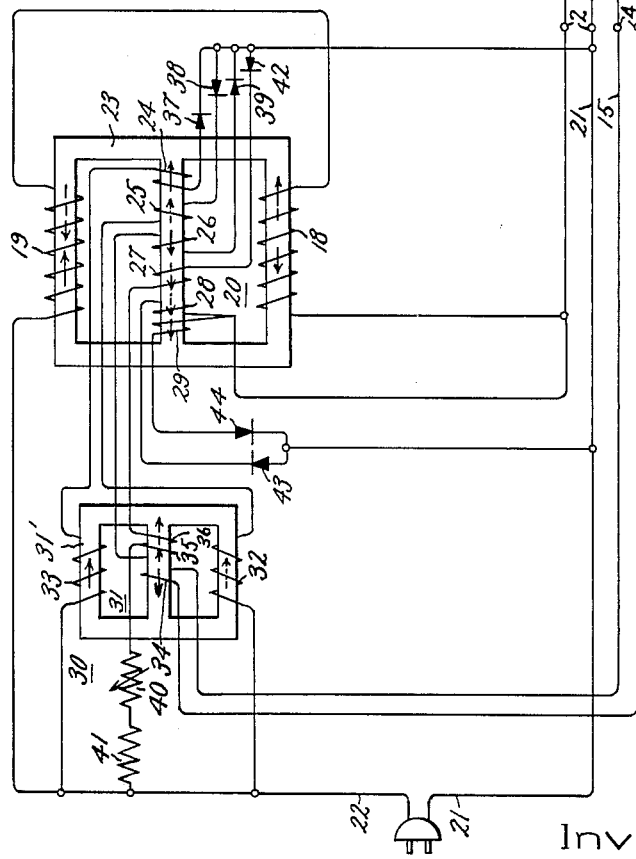
Inventor:
Raymond E. Morgan,
by Paul A. Frank
His Attorney.

United States Patent Office 2,720,579
Patented Oct. 11, 1955

2,720,579

TEMPERATURE CONTROL SYSTEM FOR ELECTRIC HEATING ELEMENTS

Raymond E. Morgan, Schenectady, N. Y., assignor to General Electric Company, a corporation of New York Application April 3, 1952, Serial No. 280,249

10 Claims. (Cl. 219—20)

My invention relates to temperature control systems for electric heating elements and more particularly to thermal control systems which utilize saturable reactors as the current regulating components of the system.

One object of the invention is to provide a simplified, stable and rugged control system which employs no fragile electron discharging components and yet is sensitive enough to function in response to a thermocouple voltage.

Another object of the invention is to provide a sensitive, static type thermal control system which employs only two saturable reactor components and does not require the usual power transformer or bias transformer.

Another object of the invention is to provide an improved two-stage magnetic amplifier circuit which utilizes pulsating direct current derived from the alternating voltage source as both the biasing and current control signals; and thus requires no full wave bridge-type rectifier networks or filtering networks.

A further object of the invention is to provide a magnetic amplifier circuit which has a positive inversely-directed output current control action immediately responsive to variations in duration rather than in amplitude of a control pulse developed in the system.

A still further object of the invention is to provide a control system for electric heating element which inherently compensates for variations in source voltage, and thus does not require a voltage-regulated source of power.

In general, my invention comprises a magnetic amplifier circuit having two saturable reactor stages in which the first stage produces output current pulses whose time of initial current rise during each source of voltage alternation varies inversely in accord with the amplitude of an input voltage derived from a thermocouple located within the heating influence of the heating element to be temperature regulated. In other words, a larger or increasing thermocouple voltage results in an earlier initial output current rise during each alternation, while a smaller or decreasing thermocouple voltage results in a later initial output current rise. The overall duration of these output current pulses thus vary directly with changes in the amplitude of the thermocouple voltage. The second stage is connected to receive the output current pulses of the first stage and supplies to the heating element current pulses whose duration is cut short by the initial current rise of the pulses received from the first stage. The duration of the current pulses supplied to the heating element thus varies inversely in accord with the amplitude of the thermocouple voltage.

The system has an inherent temperature stabilizing characteristic at the particular equilibrium temperature of the heating element at which the incremental increase in thermocouple voltage is completely compensated by a corresponding decrease in the average magnitude of current supplied to the heating element. After this equilibrium temperature is reached, any tendency of the heating element to cool as a result of greater heat dissipation requirements of a load thereon is counteracted by a corresponding decrease in the thermocouple output voltage and a corresponding increase in the duration of current pulses supplied to the heating element.

Both the first and the second stage reactors are preferably provided with a common saturation level controlling bias network which utilizes rectified pulses of current derived from the alternating voltage source to enable a simultaneous variation, in opposite directions, of both the time of rise and the time of decay of the current pulses supplied to the heating element. The duration of heating current pulses for a reference temperature of the heating element may thus be easily and sensitively adjusted to vary the equilibrium temperature at which regulation is desired. A regenerative voltage feed back circuit is preferably also included to accentuate and accelerate the rise and decay of these heating current pulses, and thus to provide a positive and definite control action.

In accord with another feature of the invention, the second saturable reactor includes two load windings in series with the alternating voltage source and connected to supply heating current pulses of alternating polarity to the heating element. The duration of the heating current pulses of each polarity are controlled by separate control windings of the second reactor, and the load windings are arranged to produce in the reactor oppositely directed magnetic flux relative to the flux produced by each control winding during its active period. Consequently, there are no induced alternating currents in the control windings and yet the heating current pulses of either polarity are controlled by the desaturating effect of the active control winding on at least one of the load windings, as will be more fully explained hereinafter.

The novel features which are believed to be characteristic of the invention are set forth in the appended claims. The invention itself, however, together with further objects and advantages thereof, may best be understood by reference to the following description taken in connection with the accompanying drawing in which Fig. 1 is a schematic circuit diagram of a temperature regulating system embodying the invention, and Fig. 2 is a group of typical wave shapes of various voltages and currents produced at designated points in the circuit of Fig. 1.

Referring to Fig. 1, one embodiment of the invention is shown as comprising a heating device 10 including a resistive heating element 11 and a thermocouple 12 having a "hot junction" 13 located within the heating influence of heating element 11 and a "cold junction" 14 located in a position more remote from heating element 11. Thermocouple junction 13 may be formed between any two dissimilar metals such as a copper wire 15 and a copper-nickel alloy wire 16, while the cold junction may conveniently be between the copper-nickel alloy wire 16 and a second copper wire 17. Device 10 may, for example, be a soldering iron of the type described in U. S. patent application Ser. No. 94,979, filed May 24, 1949, by Thomas E. Finch and assigned to the same assignee as the present invention. The soldering iron of this Finch application includes a thermocouple junction in a recess of its heat-conductive working tip.

Heating element 11 is connected through terminals 2 in series circuit with at least one load winding 18 and preferably two load windings 18 and 19 of a saturable reactor 20 between two conductors 21 and 22 adapted to be connected through terminals 3 to a source of alternating voltage (not shown). Saturable reactor 20 preferably comprises a three-legged closed core member 23 having the two load windings 18 and 19 wound on respective outer legs and at least one control winding 24 and preferably a plurality of control windings 24, 25, 26, 27, 28, and 29 wound on its central leg, as shown. Load windings 18 and 19 are wound or connected to produce oppositely directed flux in their respective outer legs during each alternation of source voltage as indicated by their associated arrows.

Control windings 24 and 25 are connected in alternate rectified output current paths of a magnetic amplifier circuit or first stage 30 which functions as the preamplifying and temperature signal controlling component of the system of Fig. 1. A saturable reactor 31 of this preamplifier stage 30 includes a three-legged core member 31' similar to core 23 having a pair of reactance windings 32 and 33 arranged on respective outer legs of core 31' and at least one signal winding 34 and preferably also a pair of bias windings 35 and 36 wound on the central leg of core 31'. Reactance winding 33 is connected in series with control winding 24 of reactor 20 and with a rectifier 37 between conductors 22 and 21; while reactance winding 32 is similarly connected in series with control winding 25 of reactor 20 and a rectifier 38 between conductors 22 and 21. Rectifiers 37 and 38 are reversely poled relative to each other in order that current will flow in each of these series circuits during alternate half-cycles of the alternating source voltage supplied between conductors 21 and 22. Reactance windings 32 and 33, however, are reversely wound or connected relative to each other such that the magnetic flux produced by each winding is in a same direction in their respective legs, as indicated by their associated arrows. Core 31' is thus saturated in the same general direction during each alternation of source voltage supplied between conductors 21 and 22 and has a unidirectional component of saturation such that stage 30 constitutes a "self-saturating" magnetic amplifier. Control windings 24 and 25 of reactor 20, connected in series respectively with reactance windings 33 and 32 of reactor 31, are wound or connected to produce similarly directed flux in the central leg of core 31, as indicated by arrows associated with these control windings. It will be appreciated, of course, that the flux produced by control winding 24 occurs during one polarity alternations of the source voltage supplied between conductors 21 and 22, while the flux produced by control winding 25 occurs during opposite polarity alternations of the source voltage.

Both reactors 20 and 31 are preferably biased by a common full-wave biasing circuit which utilizes rectified unidirectional pulses directly derived from the alternating voltage supplied between conductors 21 and 22. The biasing circuit for source voltage alternations of one polarity comprises rectifier 39, control winding 26 of reactor 20, and control winding 35 of reactor 31 connected in series with a variable resistor 40 and a fixed resistor 41 between conductors 21 and 22. The biasing circuit for source voltage alternations of an opposite polarity comprises a rectifier 42, control winding 27 of reactor 20, and control winding 36 of reactor 31 also connected in series with resistors 40 and 41 between conductors 21 and 22. Windings 35 and 36 are preferably wound or connected to produce similarly directed flux in reactor 31 during their respective conducting periods, while windings 26 and 27 are also preferably wound or connected, as shown, to produce similarly directed flux in the central leg of reactor 20 during their respective conductive periods. Due to the similar polarity of rectifiers 37 and 39, windings 24 and 26 of reactor 20 will be conductive during the same half-cycle, while windings 25 and 27 will be conductive during the same alternate half-cycle due to the similar polarity of rectifiers 38 and 42, which latter rectifiers have reversed polarity relative to rectifiers 37 and 39. Simultaneously conducting control windings 24 and 26 are preferably wound or connected to produce oppositely directed flux in the central leg of core 23 as shown, while simultaneously conducting control windings 25 and 27 are also preferably wound or connected to produce a similar flux opposition in core 23.

Control winding 34 is connected in series with thermocouple 12 through terminals 4 and arranged to produce, in response to a thermocouple signal voltage, magnetic flux in core 31' opposite to that produced by bias windings 35 or 36. Winding 34 is also connected or wound to produce flux in a direction aiding the core saturating effect of reactance windings 32 and 33 while bias windings 35 and 36 are connected or wound to produce flux in a direction opposing the core saturating effect of reactance windings 32 and 33.

A feed-back circuit for accentuating variations in the saturation level of output reactor 20 is preferably also included, and is shown in Fig. 1 as a first series circuit comprising control winding 28 and a rectifier 43, and a second series circuit comprising control winding 29 and a rectifier 44. Both series circuits are connected in parallel to receive the voltage developed across heating element 11. Due to the reversed relative polarity of rectifiers 43 and 44, control windings 28 and 29 are alternately conductive during source voltage alternations of opposite polarity and are preferably connected to produce flux in core 23 aiding the flux produced by bias windings 26 and 27 during their respective conducting periods.

The operation of the thermal control system of Fig. 1 may be easily understood by referring to the curves of Fig. 2. In Fig. 2, two groups of curves, A and B, are plotted with respect to time. In group A, curve C represents a typical current pulse through control winding 24 while curve D represents a typical current pulse through control winding 25 of reactor 20 during one cycle of the alternating source voltage cycle represented by curve E. In group B, curve F represents the current typically flowing through heating element 11 during the same alternating voltage cycle represented by curve E. During the positive alternation of source voltage E, a pulse of current flows through bias winding 35 of reactor 31 and through bias winding 26 of reactor 20 whose magnitude is controlled by the resistance of variable resistor 40. During this same positive alternation, current tends to flow through one output circuit of self-saturating magnetic amplifier stage 30, in other words, through reactance winding 33, control winding 24 and rectifier 37. Presuming that heating element 11 is initially cold, little or no signal is then supplied to signal control winding 34 of reactor 31. The amount of current flowing through reactance winding 33 and consequently through control winding 24 of reactor 20 depends upon the level of saturation in core 31' during this half-cycle. While core 31' is in a non-saturated condition, little or no current flows through reactance winding 33, but current quickly rises or "fires" the moment that saturation of core 31' is achieved. Bias winding 35 is arranged to produce flux in core 31' in opposition to the flux produced by winding 33, and thus retards the saturation of core 31' such that winding 33 does not become conductive or "fire" until fairly late in the half-cycle as indicated by curve C of Fig. 2.

During this same positive alternation of the source voltage, current tends to flow through reactance windings 18 and 19 to the heating element 11. This flow of heating current is impeded by the reactance of windings 18 and 19 and does not begin to flow to any substantial degree until core member 23 becomes magnetically saturated. The flux due to the pulse of current in bias winding 26, however, quickly drives core 23 into saturation and enables current to flow to heating element 11 after only a slight time delay usually less than 20 degrees of the alternating voltage cycle, as indicated by the initial portion of curve F of Fig. 2. The feed back voltage signal supplied to control 29 as current begins to flow in heating element 11 tends to augment the saturating effect of bias winding 26 and thus quickly drives core 23 into full magnetic saturation.

It will be appreciated that the magnetic flux due to the current in bias winding 26 is in a direction aiding the core saturating effect due to the current in winding 19 and opposing the core saturating effect due to the current in winding 18. Consequently, the outer core leg containing winding 19 is driven far into saturation while the outer core leg containing winding 18 is driven only slightly beyond the point of core saturation.

The high heating current supplied to heating element 11 thereupon continues to follow the impressed source voltage E until the initial rise of the current pulse applied to control winding 24 of reactor 20 from the output circuit of self-saturating magnetic amplifier 30. This current pulse in control winding 24 counteracts the saturating effect of the currents in bias winding 26 and in feed-back winding 29 and tends to desaturate core 23. The impedance of both load windings and particularly of load winding 18 thus increases considerably, and the current flowing through heating element 11 quickly drops to a negligible value, which drop is augmented by the drop in the feedback voltage developed across heating element 11 and supplied to feedback winding 29.

The initial rise of current to heating element 11 is thus controlled by the amplitude of the bias current pulse supplied to control winding 26, while the time of decay or extinction of the current pulse supplied to heating element 11 is controlled by the time of "firing" of saturable reactor 31. It will be appreciated that an increase in the common biasing current supplied to both reactors 20 and 31 as a result of a decrease in the resistance of resistor 40 functions during each source voltage alternation both to accelerate the initial rise of the heating current pulse and to retard the saturation of reactor 31 and thus to retard extinction of this heating current pulse.

During the succeeding negative polarity alternation of the source voltage, bias winding 36 and load winding 32 of reactor 31 as well as bias winding 27, feedback winding 28 of reactor 20, become active in the same manner as described above in connection with bias winding 35 and load winding 33 of reactor 30 and bias winding 24 and feedback winding 29 of reactor 20. Load windings 18 and 19 fulfill the same function as described above, merely carrying current in an opposite direction and producing respective oppositely-directed flux.

As heating element 11 begins to heat device 10, a thermocouple voltage is generated by thermocouple 12 and supplied to signal winding 34. The effect of this signal current in reactor 31 is opposite to that produced by bias windings 35 and 36 such that the saturation of core 31' is accelerated and the pulses of current supplied to control windings 24 and 25 occur at earlier instants of time and have a corresponding greater duration during each alternation of source voltage. Consequently, the current pulses supplied to heating element 11 are extinguished earlier during each alternation so that the duration of the heating current pulses is shortened and the magnitude of the average heating current decreased. This temperature regulating cycle continues until an equilibrium temperature is reached at which the increment of heat increase is completely compensated by the decrease in current supplied to the heating element. This equilibrium temperature is thus maintained by the thermal control system despite variations in the heat dissipation requirements upon heating element 11. This equilibrium temperature at which temperature regulation occurs can, of course, be adjusted by merely varying the magnitude of bias current controlling resistor 40.

It will thus be seen that I have provided a simple, rugged, economical, yet reliable thermal control system, which requires no power transformer, bias transformer, or other expensive components. Since the system operates upon pulsating biasing currents as well as pulsating control currents, no filter networks are necessary. Moreover, by using power windings connected in series and arranged in flux opposition in saturable reactor 20 there are no induced voltages in the various control windings 24 through 29 of reactor 20. In addition, since the heating current is controlled by the pulse duration and time of initial pulse current rise rather than the amplitude of the pulses, the control action is positive and does not change to any great extent with deterioration of the components of the system. Furthermore, since, a common biasing circuit is utilized, fluctuations in line voltage have little effect upon the circuit since saturation of both reactors is either retarded or accelerated together by such fluctuations, with the result that the current supplied to heating element 11 remains substantially constant.

Although I have described above a particular embodiment of the invention, many modifications may be made, and it is to be understood that I intend to cover by the appended claims all such modifications as fall within the true spirit and scope of this invention.

What I claim as new and desire to secure by Letters Patent of the United States is:

1. A saturable reactor system for regulating the output energy of an electrical device comprising, means for deriving from said energy a voltage representative thereof, two conductors for connection to an alternating voltage source, a saturable reactor having a control winding and a load winding, means for connecting said load winding in series with said electrical device between said two conductors, a magnetic amplifier connected between said conductors having an input circuit connected to receive said energy-representing voltage and having an output circuit including said control winding for supplying to said control winding during each alternating source voltage cycle a current pulse having a duration varying in accord with the amplitude of said energy-representing voltage, said control winding being wound in a direction to desaturate said reactor in response to said current pulse thereby substantially to extinguish current through said load winding to said device during said current pulse.

2. A thermal control system for regulating temperature of a heating device having a heating element and a thermocouple located within the heating influence of said heating element comprising, two conductors for connection to a source of alternating voltage, a saturable reactor having a control winding and a load winding, means for connecting said load winding in series with said heating element between said two conductors, a magnetic amplifier connected between said conductors having an input circuit adapted to receive an output voltage from said thermocouple and having an output circuit including said control winding and a rectifier for supplying to said control winding during source voltage alternations of one polarity a current pulse having a duration varying in accord with variations in the amplitude of said thermocouple voltage, said control winding being wound in a direction to produce, in response to said current pulse, magnetic flux in said reactor opposing the saturating effect of current in said load winding.

3. A thermal control system for regulating temperature of a heating device having a heating element and a thermocouple located within the heating influence of said heating element comprising, two conductors for connection to a source of alternating voltage, a saturable reactor having a control winding and a load winding, terminal means for connecting said load winding in series with said heating element between said two conductors, and means including a magnetic amplifier having an input circuit adapted to receive an output voltage from said thermocouple and having an output circuit including said control winding for supplying to said control winding a current pulse varying inversely in time of occurrence during source voltage alternations of one polarity in accord with the amplitude of said thermocouple voltage, said control winding being wound in flux opposition with said load winding to desaturate said reactor in response to said current pulse, thereby substantially to extinguish current supplied through said load winding to said heating element during said current pulse.

4. A thermal control system comprising two conductors for connection to a source of alternating voltage, a saturable reactor having a control winding, a bias winding, and a load winding, a heating element connected in series with said load winding between said two conductors, a thermocouple located within the heating influence of said heating element, a rectifier connected in series with said bias winding between said conductors to limit conduction through said bias winding in response to source voltage alternations of one polarity only, said bias winding producing flux in said reactor aiding the flux produced by said load winding during said one polarity source voltage alternations, and means including a magnetic amplifier having an input circuit connected to receive an output voltage from said thermocouple and having an output circuit including said control winding for supplying to said control winding a current pulse varying inversely in time of initial current rise during said one polarity source voltage alternations in accord with the amplitude of said thermocouple voltage, said control winding being wound in a direction to produce in response to said current pulse flux opposing the flux from said bias winding.

5. A thermal control system comprising two conductors for connection to a source of alternating voltage, a saturable reactor having a control winding and a load winding, a heating element connected in series with said load winding between said two conductors, a thermocouple located within the heating influence of said heating element, and means including a self-saturating magnetic amplifier connected between said thermocouple and said control winding for supplying to said control winding a current pulse having an initial current rise varying inversely in time of occurrence during source voltage alternations of one polarity in accord with the amplitude of an output voltage from said thermocouple, said control winding being wound in a direction to produce, in response to said current pulse, magnetic flux in said reactor opposing the flux of said load winding thereby substantially to extinguish the current supplied to said heating element during said current pulse.

6. A control system for regulating temperature of a heating device having a heating element and a thermocouple located within the heating influence of said heating element comprising, two conductors for connection to a source of alternating voltage, a saturable reactor having a control winding and two load windings, means for connecting said load windings in series with said heating element between said two conductors, and means including a magnetic amplifier having an input circuit for receiving an output voltage from said thermocouple and having an output circuit including said control winding for supplying to said control winding a current pulse varying inversely in time of initial current rise during source voltage alternations of one polarity in accord with the amplitude of said thermocouple voltage, said control winding being wound in a direction to produce, in response to said current pulse, magnetic flux in said reactor opposing the flux of one load winding and aiding the flux of the other load winding thereby to counteract the saturating effect and increase the impedance of said one load winding substantially to extinguish the current supplied to said heating element during said current pulse.

7. A thermal control system for regulating the temperature of a heating element comprising, a thermocouple located within the heating influence of said heating element, a first saturable reactor having a control winding and a load winding, said control winding being connected to receive the output voltage of said thermocouple and being arranged to accelerate saturation of said first reactor in response thereto, two conductors for connection to an alternating voltage source, a second saturable reactor having a control winding and a load winding, means for connecting said second reactor load winding in series with said heating element between said two conductors, and a rectifier connected in series circuit relation with said first reactor load winding and said second reactor control winding between said two conductors, said second reactor control winding being wound in flux opposition to said second reactor load winding to desaturate said second reactor in response to current passed by said rectifier and said first reactor load winding.

8. A thermal control system for regulating the temperature of a heating element comprising, a thermocouple located within the heating influence of said heating element, a first saturable reactor having a control winding and a load winding, said control winding being connected to receive the output voltage of said thermocouple and being wound in a direction to accelerate saturation of said first reactor in response thereto, two conductors for connection to an alternating voltage source, a second saturable reactor having a control winding, a bias winding, and a load winding, means for connecting said second reactor load winding in series with said heating element between said two conductors, a first rectifier connected in series circuit relation with said first reactor load winding and said second reactor control winding between said two conductors, said second reactor control winding being wound in a direction to desaturate said second reactor in response to current passed by said first rectifier and said first reactor load winding, and a second rectifier connected in series with said bias winding between said conductors and polarized to pass current during the same source voltage alternation as said first rectifier; said bias winding being wound in a direction to accelerate saturation of said second reactor in response to current passed by said second rectifier.

9. A thermal control system for regulating the temperature of a heating element comprising, a thermocouple located within the heating influence of said heating element, a first saturable reactor having a control winding, a bias winding and a load winding, said control winding being connected to receive the output voltage of said thermocouple and being wound in a direction to accelerate saturation of said first reactor in response thereto, two conductors for connection to an alternating voltage source, a second saturable reactor having a control winding, a bias winding and a load winding, means for connecting said second reactor load winding in series with said heating element between said two conductors, a first rectifier connected in series circuit relation with said first reactor load winding and said second reactor control winding between said two conductors, said second reactor control winding being wound in a direction to desaturate said second reactor in response to current passed by said first rectifier and said first reactor load winding, and a second rectifier connected in series with both bias windings between said conductors and polarized to pass current during the same source voltage alternation as said first rectifier; said first reactor bias winding being wound in a direction to retard saturation of said first reactor, and said second reactor bias winding being wound in a direction to accelerate saturation of said second reactor in response to current passed by said second rectifier.

10. A saturable reactor system for regulating the output energy of an electrical device comprising, means for deriving from said energy a voltage representative thereof, two conductors for connection to a source of alternating voltage, a saturable reactor having a control winding, a bias winding and a load winding, means for connecting said electrical device in series with said load winding between said two conductors, a rectifier connected in series with said bias winding between said conductors to limit conduction through said bias winding in response to source voltage alternations of one polarity only, said bias winding producing flux in said reactor aiding the flux produced by said load winding during said one polarity source voltage alternations, and means including a magnetic amplifier having an input circuit connected to receive said energy-representing voltage and having an output circuit including said control winding for supplying to said control winding a current pulse varying inversely in time of initial current rise during said one polarity source voltage alternations in accord with the amplitude of said energy-representing voltage, said control winding being wound in a direction to produce in response to said current pulse flux opposing the flux from said bias winding.

References Cited in the file of this patent

UNITED STATES PATENTS

| | | |
|---|---|---|
| 1,730,254 | Thomas | Oct. 1, 1929 |
| 2,086,120 | Croden | July 6, 1937 |
| 2,186,222 | Wilcox | Jan. 9, 1940 |
| 2,218,502 | Breitenstein | Oct. 22, 1940 |
| 2,276,822 | Bowman et al. | Mar. 17, 1942 |
| 2,429,827 | Lamm | Oct. 28, 1947 |
| 2,561,329 | Ahlen | July 24, 1951 |